Patented Dec. 16, 1952

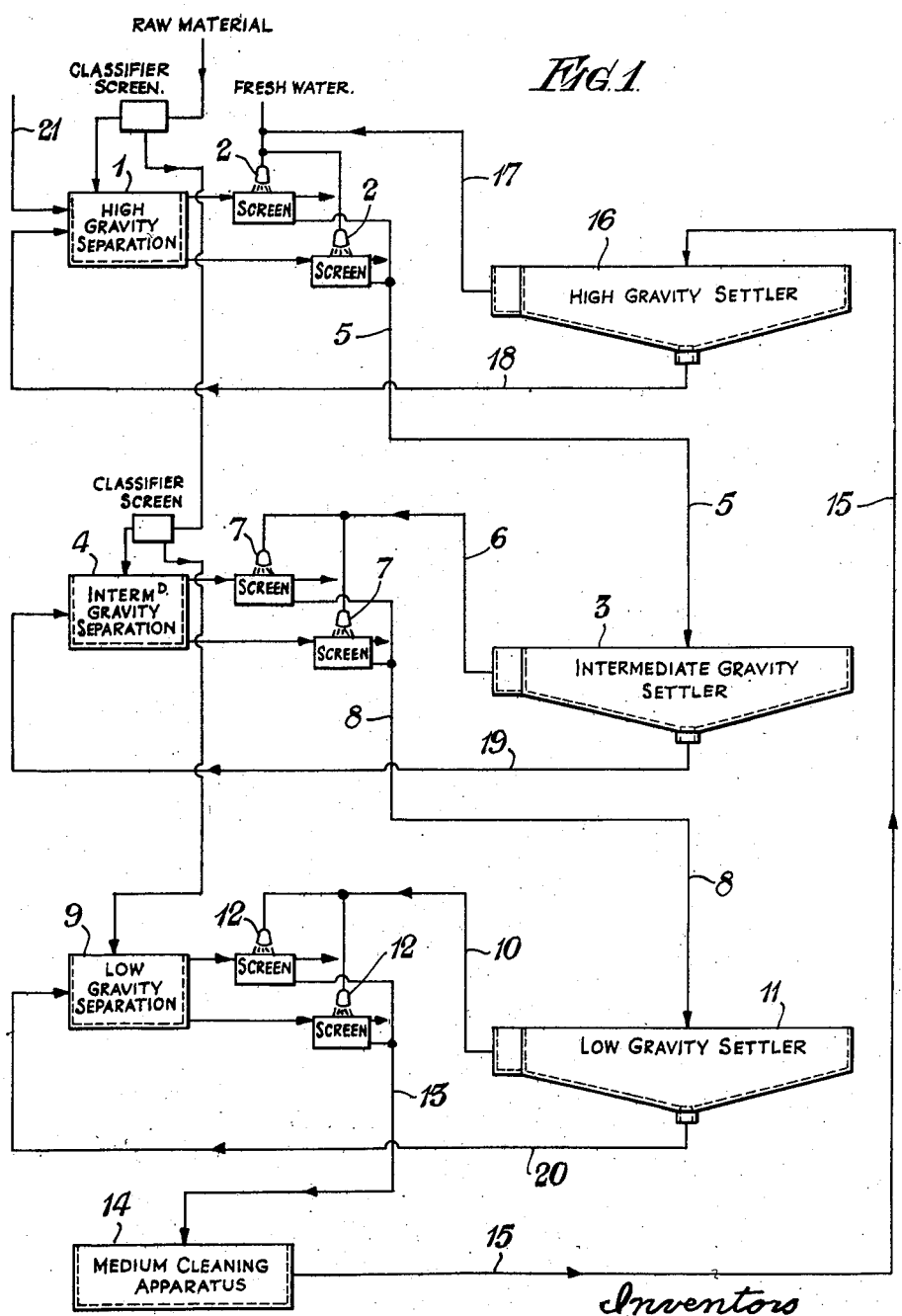

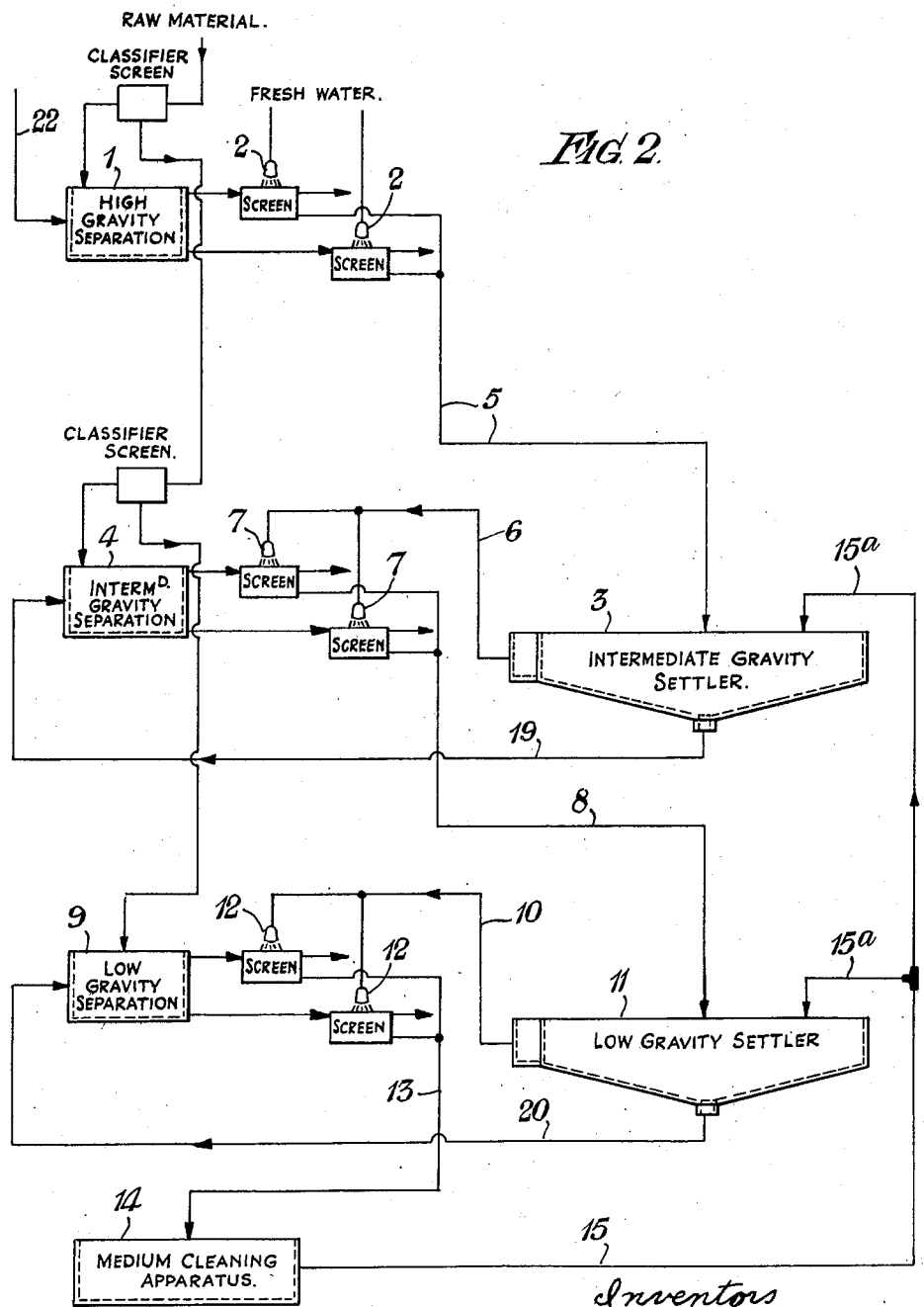

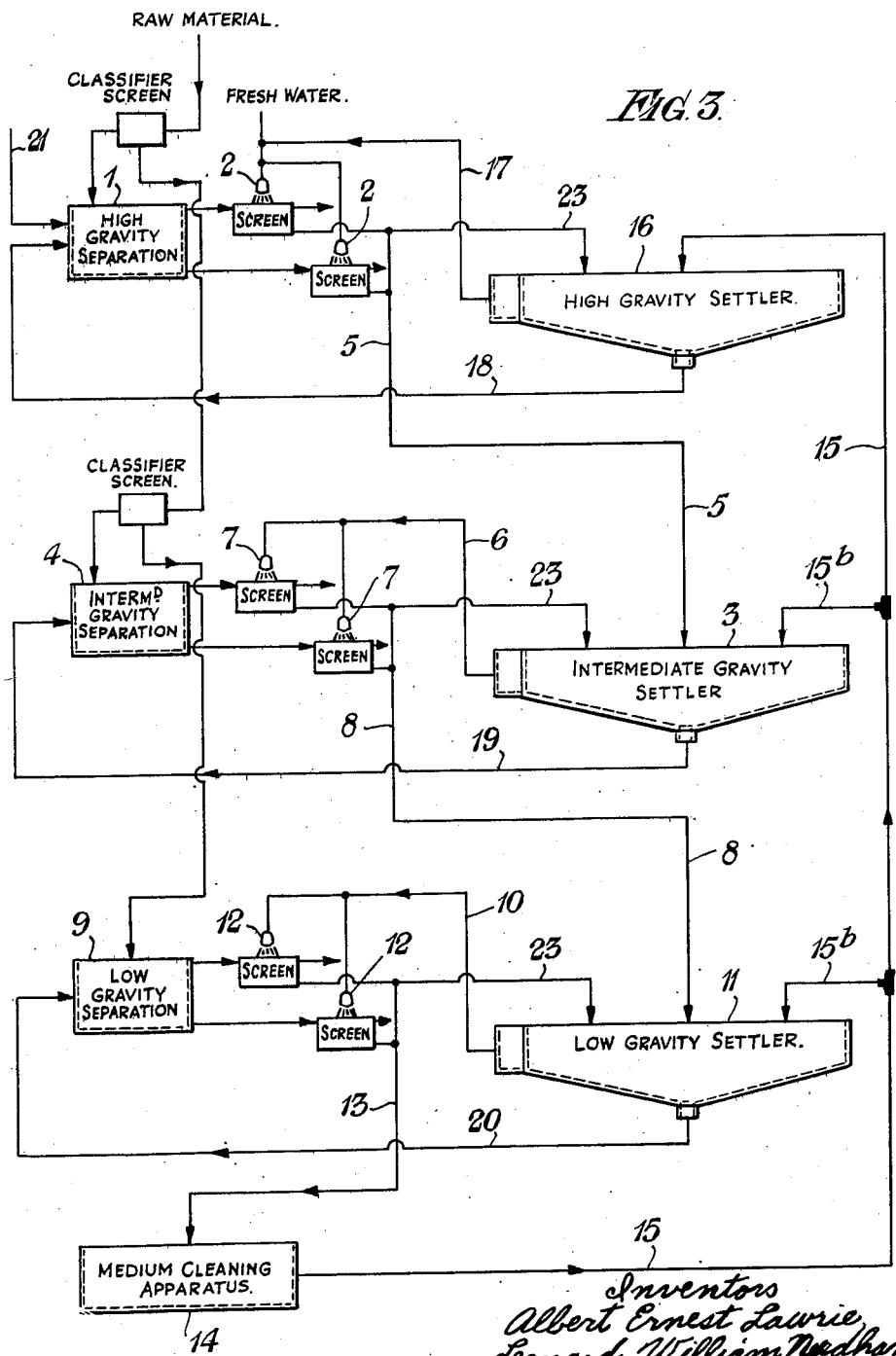

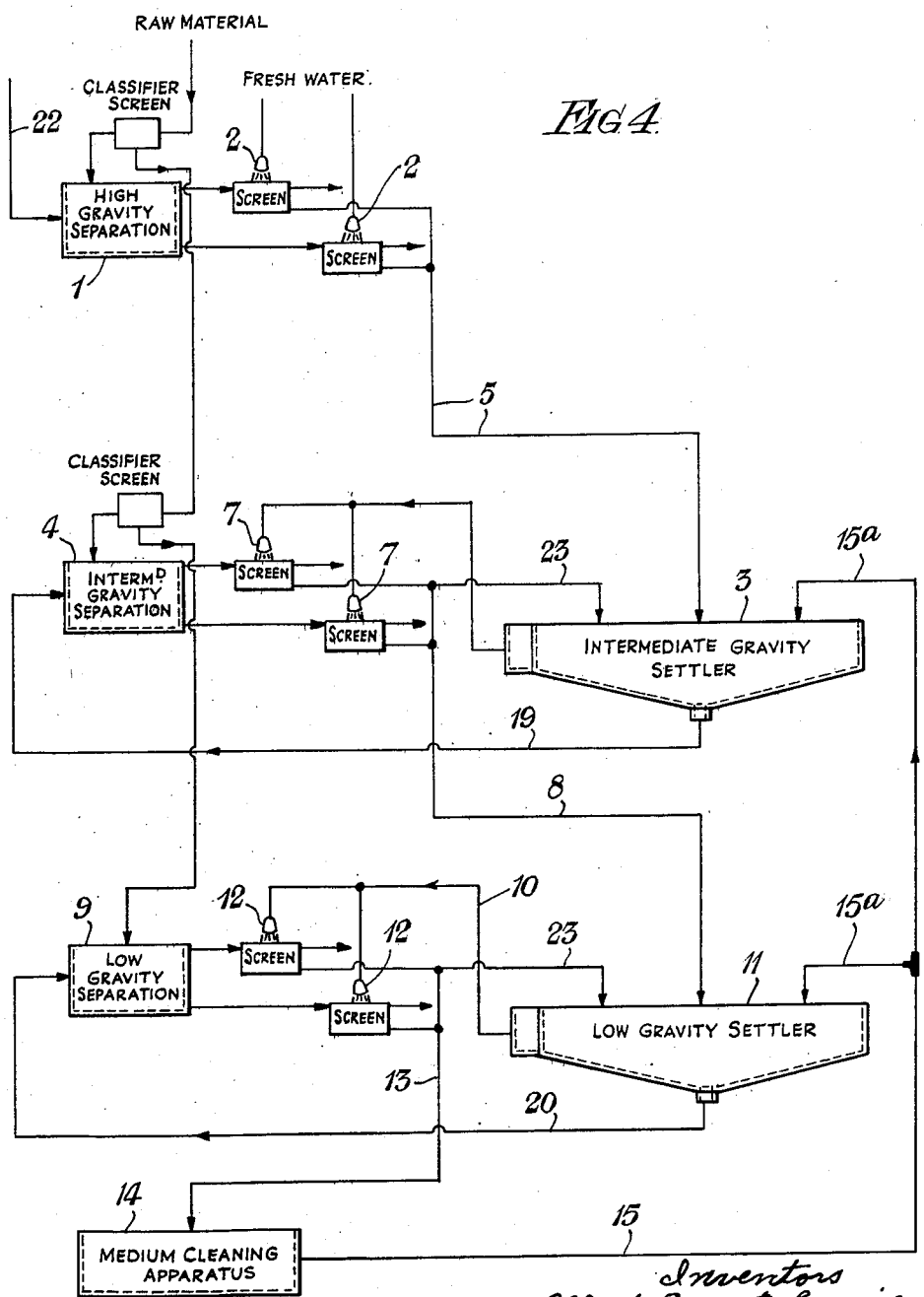

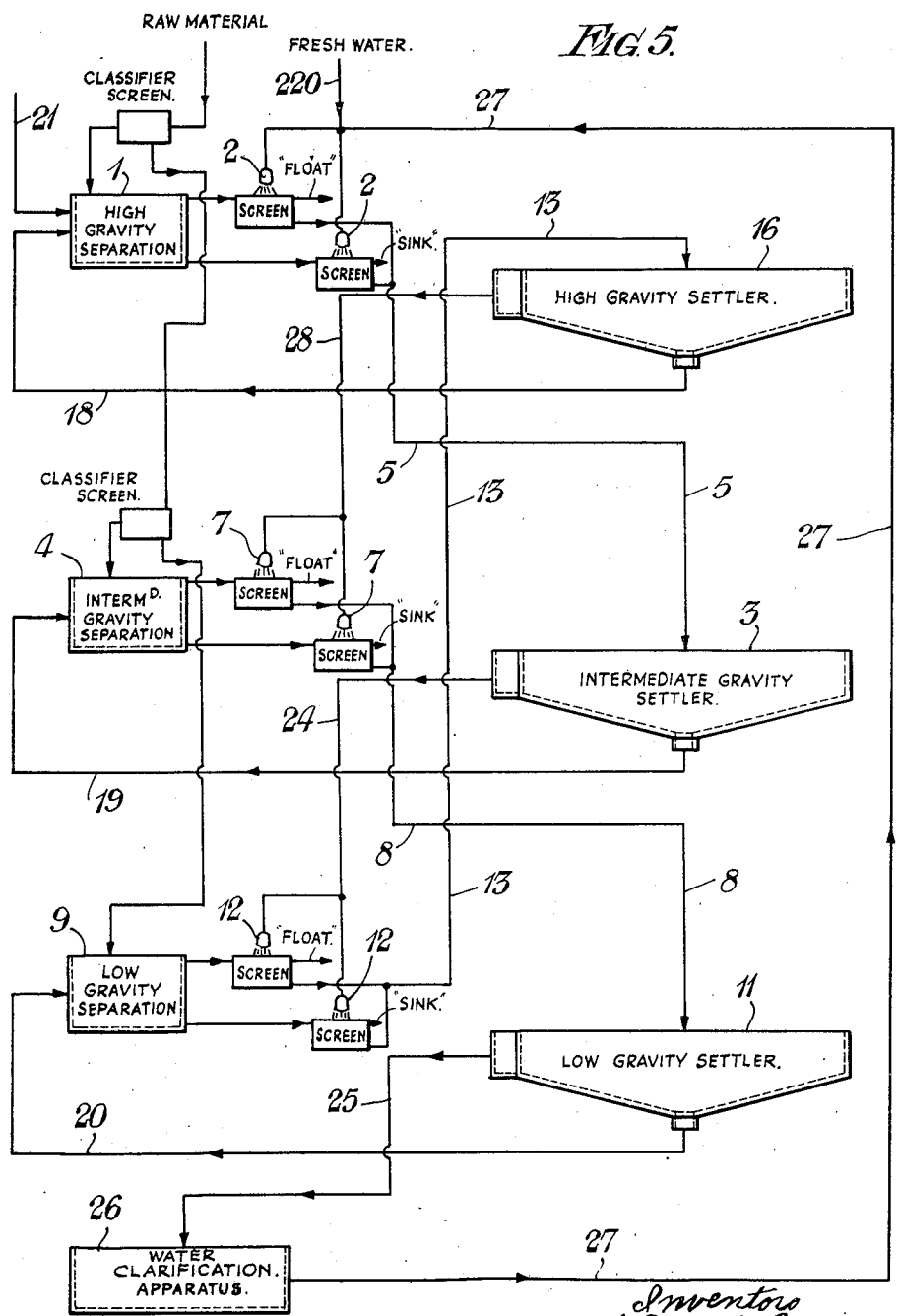

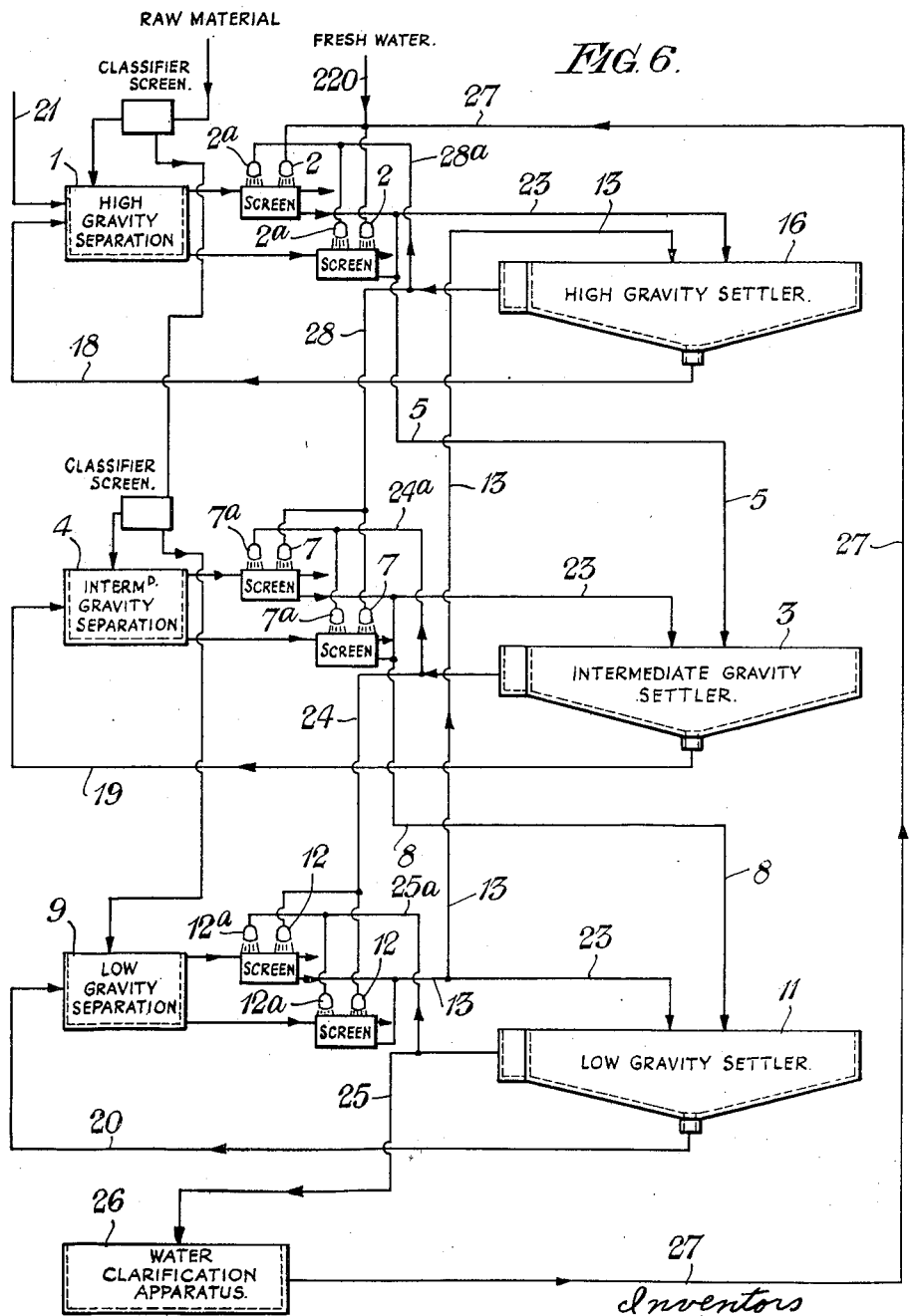

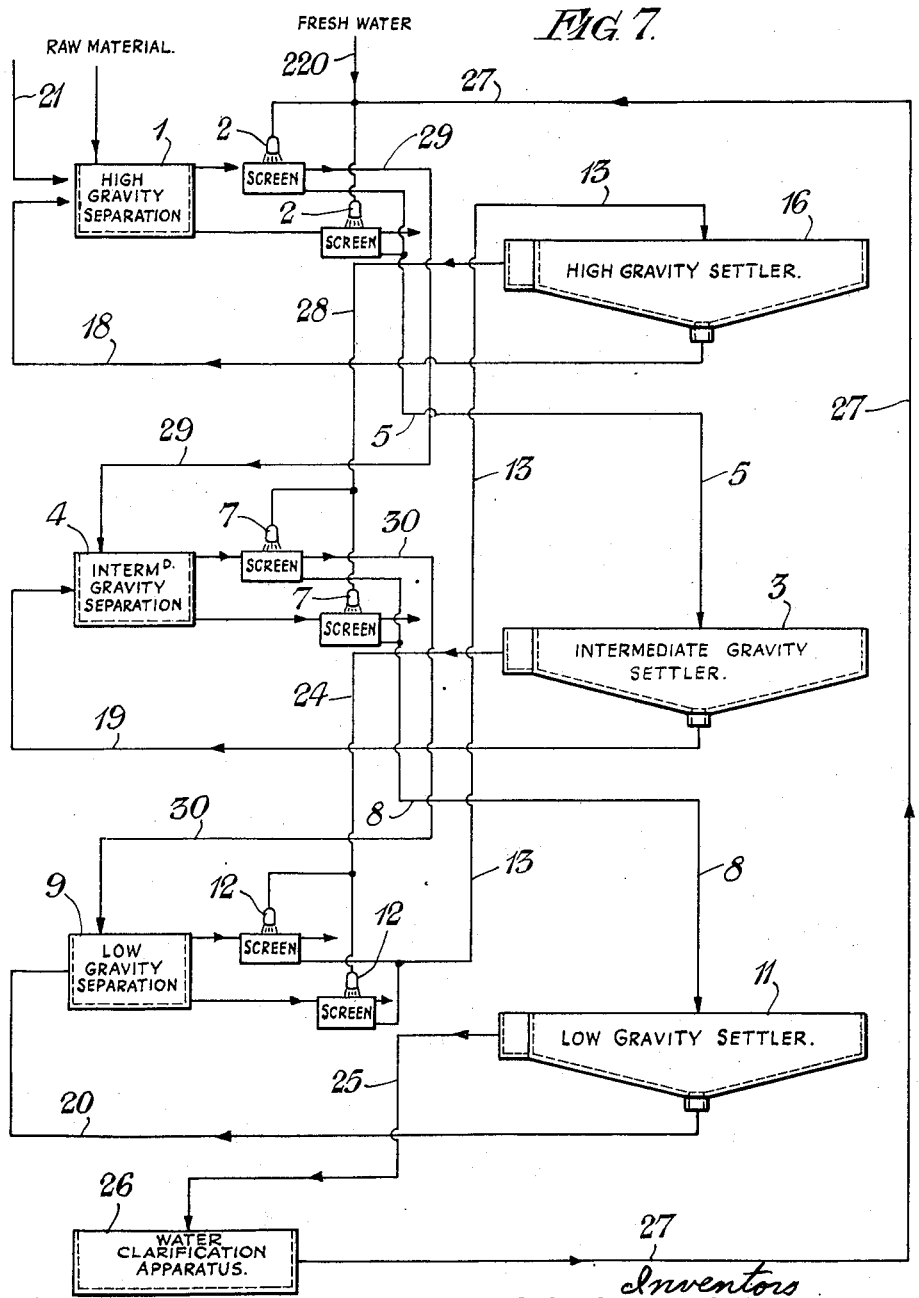

2,621,790

UNITED STATES PATENT OFFICE 2,621,790

SEPARATION OF SOLID MATERIALS OF DIFFERENT SPECIFIC GRAVITIES

Albert Ernest Lawrie and Leonard William Needham, Sheffield, England, assignors to Colliery Engineering Limited, Sheffield, England, a British joint stock company Application March 17, 1949, Serial No. 81,884
In Great Britain May 26, 1944

19 Claims. (Cl. 209—173)

This invention is concerned with avoidance of contamination of the separating liquids in that kind of sink-and-float or gravity concentration process (hereinafter referred to as a sink-and-float or gravity concentration process of the kind described) wherein use is made, for effecting the separation, of a so-called heavy separating medium in the form of a suspension obtained from finely ground solid material and an aqueous liquid and having a specific gravity which is intermediate between those of the lighter and heavier components of the solid materials to be separated.

The present application is a continuation in part of our United States Patent Application Serial No. 596,212, filed May 28, 1945 for "Separation of Solid Materials of Different Specific Gravities."

It is well known that there are three main types of process of the kind described. First, there is the type in which the solid material of the suspension though finely ground is, with relation to the other two types, comparatively coarse and can only be maintained in suspension in the aqueous liquid by means of vigorous agitation of the medium. Secondly, there is the type in which the solid material of the suspension is less coarse and has a greater measure of stability in suspension but nevertheless tends to settle out in the aqueous liquid and to stratify so that the medium comprises layers of increasing density downwards from the surface of the medium. Thirdly, there is the type in which the solid material of the suspension is ground so finely as to produce what has been termed and is now well known as a substantially stable medium. In the latter type there is still a slight tendency for the solid material to settle out in the aqueous liquid but the settling takes place at such a low rate as to have no appreciably adverse effect on the separation of the solid materials undergoing the sink-and-float or gravity concentration.

The present invention is chiefly, though not exclusively, concerned with the third above-mentioned type and for reasons which will be made apparent.

By way of explanation, it may be mentioned that in the specialised treatment of minerals for concentration thereof, and in the treatment of coal in particular, it is necessary to separate different parts of the raw material (which term may include minerals or coal from which fines have been removed), at different specific gravities, so that in any one sink-and-float separating plant, use may require to be made of heavy separating media of two or more different densities in two or more stages constituting a complete separation process.

This is because the sink-and-float process of separation enables material of a much wider size range, for example run-of-mine coal, to be treated and also highly interstratified coal, which previously necessitated hand preparation. Under such circumstances, it is convenient to make separations in the sink-and-float plant at gravities which will produce material or coal of the character most suited to the particular size range, for it is often an advantageous method of operation, particularly with coal, to keep to recognised size ranges.

In the case of coal cleaning, part of the raw material may have treatment in a suspension of high specific gravity, say about 1.7 corresponding to a size range of say 1" to ¼", another part in a suspension of intermediate density, say about 1.5 corresponding to a size range of say 2" or 3" to 1", and the further part in a suspension of low specific gravity, say about 1.3 corresponding to a size range of say plus 2" or 3".

The preparation of the raw material or coal for treatment may, of course, be modified to suit particular conditions.

For instance, banded or interstratified raw coal, say about 2" or 3" in size, may desirably be treated at successive specific gravities of say 1.3 and 1.7, the latter being employed at one time to remove the stone or reject material so that a middlings fraction between 1.3 and 1.7 may, after crushing, be subsequently retreated at the same specific gravity. This would be still at least a three stage cycle because it would necessitate an extra separating vessel operating at the 1.7 specific gravity.

In addition, there are other cases where the stages can be used to remove lower grade material which cannot be done in one separation, as for example where the heaviest raw material is rejected in the first stage separation and intermediates by the second stage separation and so on. With coal it might be necessary, for various reasons, to feed raw coal to the high gravity separation in order to remove a heavy sink product, such as pure shale, and then to re-treat the float portion in the second or intermediate gravity stage to produce a coal middlings.

Consequently, arrangements have to be made for the preparation and maintenance of separating liquids of densities varying over a wide range for the different stages.

Thus, as is well known, in the practical operation of the process of the kind described, it is necessary to ensure that the fluidity of the heavy separating media be kept high so that the separating action of the media is not impeded. Further, it is well recognised that the maintenance of satisfactory fluidity of the suspension presents increasing difficulty as the specific gravity thereof is increased. In other words, in all types of such process there is liability to disadvantage owing to contamination of the heavy separating media by finely divided particles of the treated material, both of fractions floating and fractions sinking. In known processes steps are taken to control such disadvantageous contamination. For example, in the case of coal cleaning, use is made of fine screens for the removal of the coarser grains of contaminating coal and shale and of froth flotation for the removal of the finer coal particles and, by entrainment, fine shale particles. In cases where a heavy burden of colloidal clay results from the treatment of coal it is even necessary to bleed out of the system a proportion of the circulating water containing finely divided clay to prevent undue contamination of the separating medium.

Further, it is also true of all the types of the process that such disadvantageous contamination becomes a more serious matter as the specific gravity of the suspension concerned increases. Consequently, in practice, difficulties are experienced in using suspensions in the higher range of specific gravity appropriate to the particular solid substance concerned, and in securing satisfactory control of high, intermediate and low density suspensions employed in any one plant. These difficulties are more pronounced when substantially stable suspensions are used and when suspensions of widely different densities are prepared from the same solid substance, as will be apparent.

In sink-and-float separating processes, in general, it is advisable or necessary to remove separating medium adhering to the products of separation by spraying the products with water and to re-concentrate the diluted medium so obtained in order to provide separating medium at an appropriate specific gravity, for returning to the separator. The usual practice has been to collect together the spray-diluted medium from all the separating units or separators in a plant and to pass the combined quantity so obtained into some form of settling apparatus or thickener which re-concentrates the medium and gives, as an overflow or liquid portion, water to be circulated back to the separators for use as sprays for the removal of further quantities of medium. When this practice is followed, not only is one and the same settling apparatus or thickener called upon to deliver medium at a high, low or intermediate specific gravity as required (which, in the case of settling tanks, necessitates the carrying therein of unduly heavy stock of material), but any contamination of the medium arising from the raw material treated affects adversely the whole stock of medium by causing a lowering of the average specific gravity of the solids in it. It is also known that medium-contaminating solids, especially those of a very fine and relatively light character, tend to become concentrated in the overflow from settling apparatus, and so to build up gradually in the circulating system with disadvantageous effects throughout the whole system.

It is an object of the present invention to provide a sink-and-float or gravity concentration process of the kind described, including improved means of operation for overcoming the above-mentioned difficulties and in particular means enabling highly efficient application, for carrying out such process, of heavy separating media in the form of substantially stable suspensions.

More specifically, an object of the invention is to treat economically unsized or sized solid material in a number of different gravity separations, so as to utilise the separating liquids, wash liquors and thickener liquids from one stage in another stage in order to take advantage of the different specific gravities and viscosities concerned to provide high efficiency of the cleaning of the raw material.

With these and other objects in view the invention provides, in a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages and individually thickening wash liquor from the washing step of each of said separation stages in another of such stages.

The invention further provides, in a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages, individually thickening wash liquor from the washing step of each of said separation stages in another of such stages, passing thickened product of the thickening step of each of such separation stages to the separation step of that stage, and passing liquid product from the thickening step of a separation stage to the washing step of another separation stage.

The invention is applicable irrespective of number of the plurality of stages. Thus, while it will be more particularly described hereinafter in connection with illustrative examples wherein separations are required at high, intermediate and low specific gravities, i. e. are effected in three stages, it will be understood that the general case is to be covered comprising the carrying out of the process at two or more specific gravities up to any practical number of stages.

The invention makes use of the fact that contaminating solids are more tolerable in separating medium of lower than of higher specific gravity, and as will be seen comprises steps whereby contamination may be advantageously decreased or minimised in the denser suspensions and controlled throughout the whole process in a highly efficient manner.

It will be realised that throughout the different features of the invention there is a passage of separating medium or diluted separating medium or settling apparatus or thickener overflow or liquid from one stage to another in a multi-stage sink-and-float or gravity concentration process. It might be said that there is involved a cascade or stepwise employment of separating medium or diluted separating medium or settling apparatus or thickener overflow or liquid from one stage to the next and so on throughout the process and it is believed that it will be understod that considerable advantages result from this what may be termed medium cascading principle of operation or stepwise control of medium contamination.

Thus it will be appreciated that such a cascading principle decreases in general the amount of medium needing to be put through cleaning apparatus of the kind previously mentioned, for example screens and froth flotation units. Without some such system the whole of the medium washed off the products would have to be cleansed in this way, whereas in a process according to the invention some of it, as for example that used in the highest gravity separation, may be used over again in a lower gravity separation before being treated for the removal of contaminating particles. A further advantage lies in the fact that lower gravity medium is easier to clean on account of its greater fluidity which makes it easier to screen.

The above and other objects and the features of the invention will be understood from the following description of appropriate practical examples of process in accordance with the present improvements, while the scope of the invention will be ascertainable from the claims appended hereto. The said description is aided by the accompanying drawings wherein:

Figure 1 is a diagram illustrative of one example and

Figures 2, 3, 4, 5, 6, and 7 are similar views illustrating other examples.

In each of the examples illustrated in the drawings there are three separation stages which are so marked, namely a high gravity separation, an intermediate gravity separation and a low gravity separation. In each figure of the drawings, each of the pieces of apparatus marked simply "Screen" may be a screen for the spraying only of the separated "sink" and "float" products of the corresponding separation or they may be assumed to represent the ordinary combination of drainage and spraying screens. In some of the figures, including Figure 1, the raw material is shown to be divided into three parts by the classifier screens illustrated, for example these screens may provide, for the respective separations, and in the case of coal, size ranges of say ¼" to 1" for the high gravity separation, 1" to 2" or 3" for the intermediate gravity separation, and above 2" or 3" for the low gravity separation. The division into size ranges, however, is only an example of preparatory treatment of the raw material and a further example is illustrated in Figure 7.

According to the example illustrated by Figure 1, the products of the high gravity separation at 1 are sprayed by the systems 2 with fresh or clean water and the diluted medium so obtained is led into a settling apparatus 3, such as a Dorr type thickener or a settling cone, reserved for an intermediate gravity separation such as 4 as shown by the line 5. As indicated by the line 6, the overflow from this intermediate gravity separation settling apparatus 3 is used at spraying systems 7 to spray the products of this separation and the diluted medium so obtained is passed, such as per line 8, into the settling apparatus of a lower separation stage such as the lowest gravity separation 9. As represented by the line 10, the overflow from the last settler 11 is used at the spraying systems 12 to spray the products of the lowest gravity separation 9. After this, the resulting dilute medium may be passed, as indicated by the line 13, to a medium cleaning system 14. Thence, as shown by line 15, the clean medium may be led to settling apparatus 16 reserved for the high gravity separation 1, the overflow from this apparatus supplying partly or wholly, and as per line 17, the clean water for the spraying at 2 of the products from the high gravity separation 1. In the case of each stage high, intermediate or low gravity separating medium respectively is returned to the separating unit 1, 4 or 9 from the bottom of the concomitant settling apparatus 16, 3 or 11 as indicated by the respective lines 18, 19 and 20. All the settling apparatuses used may be of the same kind and, obviously, the process could be similarly continued if there were further intermediate stages.

In this example, and as indicated by the line 21, the normal quantity of fresh medium solids, to replace the inevitable small loss through their adherence to the various separation products when discharged and their subsequent presence in the diluted medium passed down, is introduced into the high gravity separating vessel or system 1, where its freedom from contaminating impurities can give most benefit. Alternatively, and as shown by Figure 2, replenishment of the high specific gravity separation medium at 1 may, as indicated by line 22, be entirely effected by freshly mixed medium, thus eliminating a settling apparatus for the high gravity stage. The cleaned medium solids from the diluted medium passed down at 13 from the lowest gravity separation 9 may then be used, as indicated for example by the lines 15, 15a, for replenishment in the other separation stages. Other parts in Figure 2, which are similar to those in Figure 1, are similarly numbered.

By modification of the examples illustrated in Figures 1 and 2, and as indicated for instance by the inclusion of the branch lines 23 in Figures 3 and 4 respectively, part only of the diluted medium is passed down the system by the lines 5 and 8 from a higher to a lower gravity separation stage and finally, after cleaning, by the line 15 from the lowest to the highest, or other separation stage according to the degree of contamination experienced or the relative amounts of material being treated in the different separation stages. The lines 23 lead to the respective settling apparatuses 16, 3 and 11. Other parts in Figures 3 and 4 which are similar to those in Figures 1 and 2, are similarly numbered.

The following particulars may be given, though without limitation of the invention, to illustrate the application of the form of the invention involving stepwise passing down the system of dilute medium. In a three stage separation process involving the use of high, intermediate and low gravity separating media the maximum permissible proportions of contaminating solids might be five, fifteen, and twenty-five per cent of the total solid content of the separating medium for the high, intermediate and low gravity separations respectively, while the corresponding rates of contamination, depending on the nature, amount and method of handling of the raw materials and products may be 3.0, 2.0 and 1.0 per cent per hour respectively.

Under these circumstances, in order to avoid contamination of the medium in excess of the permissible maximum and to provide a reasonable margin of safety it might be decided to obtain and maintain concentrations of contaminants of four, fourteen and twenty-four per cent respectively for the high, intermediate and low gravity separating media. This could be done by passing down the Figure 3 system, for example, three quarters of the dilute medium from the high gravity separation stage 1, about one third of that from the intermediate stage 4 and finally by cleansing one quarter of that from the lowest gravity stage 9, the clean medium so obtained being distributed between the various stages as required as indicated by the lines 15, 15b for instance, but returning mainly to the high gravity separating system.

In carrying out the invention according to the example depicted by Figure 5, the products of the high gravity separation at 1 are sprayed by the systems 2 with clean water and the diluted medium so obtained is led into a settling apparatus 3, such as a Dorr type thickener or a settling cone, reserved for the intermediate gravity separation 4, as shown by the line 5. As indicated by the line 24, the overflow from this intermediate gravity separation settling apparatus 3 is passed down the system to the spraying systems 12 of a lower, e. g. the lowest, gravity separation 9 to spray the products of this separation and the diluted medium so obtained is passed, such as per line 13, into a settling apparatus 16 for the high gravity separation 1. As represented by the line 25, the overflow from the low gravity settler 11 is passed to a water clarification system 26. Thence, as shown by line 27, the clarified water or clear liquor may be led to the spraying systems 2 of the high gravity separation 1 while, as shown by line 28, the overflow from the settler 16 of this separation supplies the spraying systems 7 of the products from the intermediate gravity separation 4, the resulting diluted medium being passed, as by the line 8, to the settling apparatus 11 of the low gravity separation 9. In the case of each stage high, intermediate or low gravity separating medium respectively is returned to the separating unit 1, 4 or 9 from the bottom of the concomitant settling apparatus 16, 3 or 11 as indicated by the respective lines 18, 19 and 20. All the settling apparatuses used may be of the same kind and, obviously, the process could be similarly continued if there were further intermediate stages.

In this example, and as depicted by the line 21, the normal quantity of fresh medium solids, to replace the inevitable small loss through adherence to the various separation products when discharged and their subsequent presence in the diluted medium passed down, is introduced into the high gravity separating vessel or system 1, where its freedom from contaminating impurities can give most benefit. Fresh water for replenishment purposes may be supplied to the spraying systems 2 of the high gravity separation as shown by the line 220.

By modification of the example illustrated in Figure 5, and as indicated for instance by the inclusion of the branch lines 23 in Figure 6, part only of the diluted medium is passed down the system by the lines 5 and 8 from a higher to a lower gravity separation stage and finally, after cleaning, by line 13 from the lowest to the highest, or other, separation stage according to the degree of contamination experienced or the relative amounts of material being treated in the different separation stages. The lines 23 lead to the respective settling apparatuses 16, 3 and 11. Other parts in Figure 6 which are similar to those in Figure 5, are similarly numbered.

In a further modification of the example illustrated in Figure 5, a part only of the overflow from the settling apparatus for any or each separation stage of the complete system may be passed down, the quantity being determined by the degree of contamination of the medium which is taking place and by the specific gravities desired to be maintained at the various stages in the whole operation. Exemplification of this modification is also provided by Figure 6 which indicates that part of the overflow may be directed as before, as depicted by the lines 28, 24, 25, while the remainder is directed back to a spraying system at 2a, 7a and 12a for the corresponding separating plants 1, 4 and 9, as represented by the lines at 28a, 24a and 25a. The clarified water or clean liquid recovered from the water clarification apparatus 26 may be returned to the highest gravity separation system 1 as before or to any one or both of the others, as required.

Where the amount of settling apparatus overflow passed down the system is small enough, the appropriate quantity of overflow from the last settling apparatus 11, namely that for the low gravity separation stage 9, can be allowed to run to waste and entirely fresh water can be used for the spraying of the separation products from the high gravity separation stage 1. This modification, which will be understood without illustration, is applicable with advantage to cases in which, owing to the differing tonnages being treated in the high, intermediate and low specific gravity separations, the quantities of settling apparatus overflows are not exactly suited to the various stages in the whole operation.

The example shown in Figure 7 is illustrative of a different arrangement of the raw material which is usable in any of the separating processes of the present invention. According to this example, the whole of the raw material is passed to the high gravity separation at 1 to remove the heaviest constituent after spraying at 2. The float or lighter constituent is passed down the system to the intermediate gravity separation 4, as shown by the line 29, in order to obtain a middlings product as "sink" material. The latter, after spraying at 7, could be discharged while the float from 4 may be led, as by the line 30, to the low gravity separation stage at 9 to remove any further impurity. Other parts in Figure 7 which are similar to those shown in Figure 5 are similarly numbered for reference.

The following particulars may be given, though without limitation of the invention, to illustrate the application of the form of the invention involving stepwise passing down the system of dilute medium and thickener overflow. In a three stage separation process involving the use of high, intermediate and low gravity separating media the maximum permissible proportions of contaminating solids might be five, fifteen, and twenty-five per cent of the total solid content of the separating medium for the high, intermediate and low gravity separations respectively, while the corresponding rates of contamination, depending on the nature, amount and method of handling of the raw materials and products may be 3.0, 2.0 and 1.0 per cent per hour respectively.

Under these circumstances, in order to avoid contamination of the medium in excess of the permissible maximum and to provide a reasonable margin of safety it might be decided to obtain and maintain concentrations of contaminants of four, fourteen and twenty four per cent respectively for the high, intermediate and low gravity separating media. This could be done by passing down the Figure 6 system, for example, three quarters of the dilute medium from the high gravity separation stage 1, about one third of that from the intermediate stage 4 and finally by clarifying one quarter of the overflow liquid from the lowest gravity stage settler 11, the clarified water or clean liquor so obtained being returned wholly or mainly to the spraying systems 2 of the high gravity separation 1.

The following particulars, referring to the usual case in coal cleaning where the smaller coal, which contaminates the medium most rapidly, is treated at the high gravity, may be given to exemplify the modification of the invention wherein a part only of the settling apparatus overflow is passed down the system. In a particular case of a three-stage separation experience may show that the properties of the separating medium become unsatisfactory when the concentrations of solids in the settling apparatus overflows exceed 0.3, 0.6 and 1.0 per cent for the high, intermediate and low gravity separation settling apparatus respectively. The limits in such concentrations are determined by a variety of circumstances, including the nature, amount and method of handling of the raw material, the precise specific gravities of operation, the accuracy of separation required and other factors, so that the limiting concentrations of contaminants just stated should be regarded as indicative only of the order of permissible solid contents and not in any way as limiting the invention.

In a case of the nature now being described, the rate of contamination of these settling apparatus overflows might be 0.15, 0.03, 0.03 per cent per hour respectively, and these rates will determine the proportion of overflow to be passed down the system. Thus, for the high gravity stage, with a limiting satisfactory concentration of 0.3 per cent solids, it might be decided, in order to give a practical working margin, not to allow this concentration to rise above 0.2% solids by passing down to the next stage about three quarters of the settling apparatus overflow. Similarly, the proportion of the intermediate stage settling apparatus overflow passed down might be one half and of the low gravity separation settling apparatus overflow (passed to the clarification plant 26) about one third. The actual amounts of such overflows will depend mainly on the tonnages and sizes of material being treated but clearly any disparities arising from this cause can be corrected by suitable distribution of the water, returned from the cleaning plant, between the high, intermediate and low gravity separation systems.

It will be appreciated that the stepwise passing down the system of dilute medium and overflow liquid defers the cleaning of the dilute medium and overflow liquid until the medium solids have been used as long as possible and full advantage has been taken of the greater ability of the lower gravity media to tolerate contaminants.

This offers a marked, and advantageous, contrast with methods wherein the dilute medium from each stage is cleaned separately and there is a separate medium circuit, including cleaning operations, for each separate stage in a process involving more than one separation. However, the invention broadly covers appropriate combinations of the previously known systems with those now described as will be understood.

It will be evident that the application of the invention to the stepwise passing down the system of dilute medium and settling apparatus or thickener overflow or liquid, implies the use, within each of the separating gravity medium circuits, i. e. high, intermediate and low, of usual apparatus for the removal of contaminants from the medium and does not call for any special apparatus. It really amounts to the application of the invention for the control of contamination of the medium circuit by the kind of fine particles, particularly finely divided clay particles in coal cleaning, which tend to accumulate in the settling apparatus or thickener overflows or liquid appropriate to each stage of the process. Obviously, instead of using settling apparatus for thickening the dilute medium, the known cyclone type thickeners may be employed which provide a thickened medium product and a liquid portion corresponding to the aforesaid overflow.

It will be realised that in passing diluted medium resulting from spraying of the products of separation from one stage to the settling apparatus or thickener of the same or a subsequent stage advantageous use is suitably made of individual settling apparatuses or thickeners for a plurality of stages and it is an important part of the invention that in a multi-stage separation process use is made of individual settling apparatuses or thickeners for such medium.

We claim:

1. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, individually thickening wash liquor from the washing step of each of at least two of said separation stages in the thickener appertaining to the next following stage and delivering thickened suspension from each thickener to the separating step of the same stage.

2. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, thickening wash liquor from the washing step of each of at least two of said separation stages partly in a thickener individual to that stage and partly in a thickener individual to another of the stages and delivering thickened suspension from each thickener to the separating step of the same stage.

3. In a sink-and-float process of separating solid materials of different specific gravities comprising operation in a plurality of stages by the use in the several stages of heavy separating liquids of different specific gravities in the form of suspensions of solids in liquid each of which stages has a liquid thickener appertaining thereto, the steps of washing the separation products of each of said separation stages separately for each stage, individually thickening wash liquor from the washing step of each of at least two of said separation stages in a thickener of the next following stage, delivering thickened suspension from each thickener to the separating step of the same stage and cleaning the wash liquor of a low gravity separation stage in passing from this stage to the respective thickening step.

4. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, individually thickening wash liquor from the washing step of each of said separation stages in another of such stages, passing thickened product of the thickening step of each of said separation stages to the separation step of that stage, and passing liquid product from the thickening step of each of at least two of said separation stages respectively to the washing step of the separation stage next following it.

5. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, thickening wash liquor from the washing step of each of said separation stages partly in a thickener individual to that stage and partly in a thickener individual to another of the stages, passing thickened product of the thickener of each of said separation stages to the separation step of that stage, and passing liquid product from the thickener of each of at least two of said separation stages respectively to the washing step of the separation stage next following it.

6. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, thickening wash liquor from the washing step of each of said separation stages in a thickener individual to another of the stages, passing thickened product of the thickener of each of said separation stages to the separation step of that stage, and passing liquid product from the thickener of each of said separation stages partly to the washing step of that stage and partly to the washing step of another separation stage.

7. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, individually thickening wash liquor from the washing step of each of said separation stages in another of such stages, passing thickened product of the thickening step of each of said separation stages to the separation step of that stage, passing liquid product from the thickening step of each of said separation stages to the washing step of another of said separation stages and clarifying the liquid product from the thickening step of a low gravity separation stage in passing from this thickening step to the respective washing step.

8. A sink-and-float process of separating solid materials of different specific gravities, comprising the steps of separating the raw material in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, removing medium solids adhering to a separated product of each of said three separation stages by washing such product of each of the three separations individually, passing wash liquor from said first and second separation stages respectively to respective thickeners of said second and third separation stages, subjecting wash liquor from said third separation stage to a medium cleaning step, passing cleaned medium from said medium cleaning step to a thickener of said first separation stage, and passing thickened product from said thickener of each separation stage to the separating step of that stage.

9. A sink-and-float process of separating solid materials of different specific gravities, comprising the steps of separating the raw material in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, said first, second and third stages respectively having a high gravity thickener, an intermediate gravity thickener and a low gravity thickener, removing medium solids adhering to a separated product of each of said three separation stages by washing such product of each of the three separations individually, thickening wash liquor from said first separation stage in said intermediate gravity thickener of said second separation stage, passing thickened medium from said intermediate gravity thickener to the separating step of said second separation stage, thickening wash liquor from said second separation stage in said low gravity thickener of said third separation stage, passing thickened medium from said low gravity thickener to the separating step of said third separation stage, passing wash liquor from said third separation stage to a medium cleaning step, passing cleaned medium from said medium cleaning step to said high gravity thickener of the first separation stage and passing thickened medium from said high gravity thickener to the separating step of said first separation stage.

10. A sink-and-float process of separating solid materials of different specific gravities, comprising the steps of separating the raw materials into at least three sized fractions, treating such fractions respectively in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, said first, second and third stages respectively having a high gravity thickener, an intermediate gravity thickener and a low gravity thickener, removing medium solids adhering to a separated product of each of said three separation stages by washing such product of each of the three separations individually, thickening the wash liquor from said first separation stage in said intermediate gravity thickener of said second separation stage, passing the thickened medium from said intermediate gravity thickener to the separating step of said second separation stage, passing the overflow liquid from said intermediate gravity thickener to the washing step of said second separation stage, thickening the wash liquor from said second separation stage in said low gravity thickener of said third separation stage, passing the thickened medium from the said low gravity thickener to the separating step of said third separation stage, passing the overflow liquid from said low gravity thickener to the washing step of said third separation stage, passing the wash liquor from said third separation stage to a medium cleaning step, passing the cleaned liquor to said high gravity thickener of said first separation stage, passing the thickened medium from said high gravity thickener to the separating step of said first separation stage and passing the overflow liquid of said high gravity thickener to the washing step of said first separation stage.

11. A sink-and-float process of separating solid materials of different specific gravities, comprising the steps of separating the raw material in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, removing medium solids adhering to a separated product of each of said three separation stages by washing such product of each of the three separations individually, separately thickening the wash liquors from each of said separations, passing a thickened media portion of each of the thus thickened wash liquors to the respective separations, passing a liquid portion resulting from the thickening of the wash liquors of the first and second separations respectively to the washing steps of the second and third separations, clarifying a liquid portion resulting from the thickening of the wash liquors at the third stage, and passing clarified liquid thus obtained to another of the washing steps.

12. Process according to claim 11, wherein the clarified liquid is passed to the washing step of the first separation stage.

13. A sink-and-float process of separating solid materials of different specific gravities, comprising the steps of separating the raw material in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, said first, second and third stages respectively having a high gravity thickener, an intermediate gravity thickener and a low gravity thickener, removing medium solids adhering to a separated product of each of said three separation stages by washing such product of each of the three separations individually, thickening wash liquor from the said first separation stage in said intermediate gravity thickener of said second separation stage, passing thickened medium from the said intermediate gravity thickener to the separating step of said second separation stage, passing overflow liquid from the said intermediate gravity thickener to the washing step of the third separation stage, thickening wash liquor from the said second separation stage in said low gravity thickener of said third separation stage, passing thickened medium from the said low gravity thickener to the separating step of the said third separation stage, passing overflow liquid from the said low gravity thickener to a clarification step, passing clarified liquid thus obtained to the said high gravity washing step of the first separation stage, thickening wash liquor from the third separation stage in said high gravity thickener of the first separation stage, passing overflow liquid from the said high gravity thickener to the washing step of the second separation stage, and passing thickened medium from the said high gravity thickener to the separating step of said first separation stage.

14. A sink-and-float process of separating solid materials of different specific gravities, comprising the steps of separating the raw material in at least three gravity liquid separation stages using in those three stages suspensions of solid in liquid which provide in the first stage of the three a separating medium of higher specific gravity than in the third stage and in the second stage a separating medium of specific gravity intermediate between those of said first and third stages, said first, second and third stages respectively having a high gravity thickener, an intermediate gravity thickener and a low gravity thickener, removing medium solids adhering to a separated product of each of said three separation stages by washing such product of each of the three separations individually, thickening wash liquor from the said first separation stage partly in said high gravity thickener and partly in said intermediate gravity thickener, passing thickened medium from the said intermediate gravity thickener to the separation step of said second separation stage, passing overflow liquid from the said intermediate gravity thickener to the washing step of the third separation stage, thickening wash liquor from said second separation stage partly in said intermediate gravity thickener and partly in said low gravity thickener, passing thickened medium from the said low gravity thickener to the separating step of said third separation stage, passing overflow liquid from the said low gravity thickener to a clarification step, passing clarified liquid thus obtained to the said high gravity washing step of the first separation stage, thickening wash liquor from the third separation stage partly in said low gravity thickener and partly in said high gravity thickener, passing overflow liquid from the said high gravity thickener to the washing step of the second separation stage, and passing thickened medium from the said high gravity thickener to the separating step of said first separation stage.

15. A sink-and-float process of separating solid materials of different specific gravities, comprising the steps of separating the raw material in at least three gravity liquid separation stages using in those three stages suspensions of solid in liquid which provide in the first stage of the three a separating medium of higher specific gravity than in the third stage and in the second stage a separating medium of specific gravity intermediate between those of said first and third stages, said first, second and third stages respectively having a high gravity thickener, an intermediate gravity thickener, and a low gravity thickener, removing medium solids adhering to a separated product of each of said three separation stages by washing such product of each of the three separations individually, thickening wash liquor from the said first separation stage in said intermediate gravity thickener, passing thickened medium from the said intermediate gravity thickener to the separating step of said second separation stage, passing overflow liquid from the said intermediate gravity thickener partly to the washing step of the said second separation stage and partly to the washing step of the third separation stage, thickening wash liquor from the said second separation stage in said low gravity thickener, passing thickened medium from the said low gravity thickener to the separating step of said third separation stage, passing overflow liquid from the said low gravity thickener partly to the washing step of the said third separation stage and partly to a clarification step, passing clarified liquid thus obtained to the said high gravity washing step of the first separation stage, thickening wash liquor from the third separation stage in said high gravity thickener of the first separation stage, passing overflow liquid from the said high gravity thickener partly to the washing step of the first separation stage and partly to the washing step of the second separation stage, and passing thickened medium from the said high gravity thickener to the separating step of the first separation stage.

16. A sink-and-float process of separating solid materials of different specific gravities, comprising the steps of separating the raw materials in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, removing medium solids adhering to a separated product of each of said three separation stages by washing such product of each of the three separations individually, separately thickening the wash liquors from each of at least the second and third of said separations, passing the thickened media portion of the thus thickened wash liquors to the one separation, passing the liquid portion resulting from the thickening of the wash liquors to the washing step of an individual separation and clarifying the liquid portion resulting from the thickening of the wash liquors at the third stage in passing to another of the washing steps.

17. A sink-and-float process of separating solid materials of different specific gravities, comprising the steps of separating the raw materials in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, said first, second and third stages respectively having a high gravity thickener, an intermediate gravity thickener and a low gravity thickener, removing medium solids adhering to a separated product of each of said three separation stages by washing such product of each of the three separations individually, thickening the wash liquor from the said first separation stage in said intermediate gravity thickener of said second separation stage, passing the thickened medium from the said intermediate gravity thickener to the separating step of said second separation stage, passing the overflow liquid from the said intermediate gravity thickener to the washing step of the third separation stage, thickening the wash liquor from the said second separation stage in said low gravity thickener of said third separation stage, passing the thickened medium from the said low gravity thickener to the separating step of said third separation stage, passing the overflow liquid from the said low gravity thickener to a clarification step, passing clarified liquid thus obtained to the said high gravity washing step of the first separation stage, thickening the wash liquor from the third separation stage in said high gravity thickener of the first separation stage, passing the overflow liquid from the said high gravity thickener to the washing step of the second separation stage, and passing the thickened medium from the said high gravity thickener to the separating step of the first separation stage.

18. In a sink-and-float process of separating solid materials of different specific gravities comprising operation in a plurality of stages by the use in the several stages of heavy separating liquids of different specific gravities in the form of suspensions of solids in liquid, the steps of washing the separation products of each of said separation stages separately for each stage, passing wash liquor from the washing step of one of said separation stages to a second one of said separation stages and thickening the same there, passing wash liquor from the washing step of the last-mentioned stage to a third one of said separation stages and thickening the same there, and passing thickened products respectively of said thickening in said second and third ones of said separation stages to the separating steps respectively of said second and third ones of said separating stages.

19. A sink-and-float process of separating solid materials of different specific gravities, comprising the steps of separating the raw material in at least three gravity liquid separation stages using in those three stages suspensions of solids in liquid which provide in the first stage of the three a separating medium of higher specific gravity than in the third stage and in the second stage a separating medium of specific gravity intermediate between those of said first and third stages, removing medium solids adhering to a separated product of each of said three separation stages by washing such product of each of the three separations individually, passing wash liquor from said first and second separation stages respectively to respective thickeners of said second and third separation stages, subjecting wash liquor from said third separation stage to a medium cleaning step, passing cleaned medium from said medium cleaning step to a thickener of one of said separation stages, and passing thickened product from each of said thickeners to the separating step of its own stage.

ALBERT ERNEST LAWRIE.
LEONARD WILLIAM NEEDHAM.

REFERENCES CITED

The following references are of record in the file of this patent:

UNITED STATES PATENTS

| Number | Name | Date |
|---|---|---|
| 1,685,521 | Chance | Sept. 25, 1928 |
| 2,190,637 | Rakowsky et al. | Feb. 13, 1940 |
| 2,373,635 | Wuensch | Apr. 10, 1945 |
| 2,379,184 | Rakowsky | June 26, 1945 |
| 2,387,866 | Walker | Oct. 30, 1945 |